United States Patent
Hong

(10) Patent No.: US 11,224,000 B2
(45) Date of Patent: Jan. 11, 2022

(54) USER EQUIPMENT ACCESS CONTROL METHOD AND DEVICE

(71) Applicant: BEIJING XIAOMI MOBILE SOFTWARE CO., LTD., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/760,892

(22) PCT Filed: Nov. 15, 2017

(86) PCT No.: PCT/CN2017/111089
§ 371 (c)(1),
(2) Date: Apr. 30, 2020

(87) PCT Pub. No.: WO2019/095141
PCT Pub. Date: May 23, 2019

(65) Prior Publication Data
US 2021/0185591 A1 Jun. 17, 2021

(51) Int. Cl.
*H04W 48/18* (2009.01)
*H04W 48/04* (2009.01)
(Continued)

(52) U.S. Cl.
CPC ....... *H04W 48/04* (2013.01); *H04W 36/0061* (2013.01); *H04W 48/18* (2013.01); *H04W 84/042* (2013.01)

(58) Field of Classification Search
CPC ..... H04W 48/04; H04W 24/08; H04W 48/18; H04W 72/048
See application file for complete search history.

(56) References Cited

U.S. PATENT DOCUMENTS

| | | | |
|---|---|---|---|
| 2015/0215832 A1 | 7/2015 | Fitzpatrick | |
| 2018/0020330 A1* | 1/2018 | Li | H04B 7/08 |
| 2018/0041897 A1* | 2/2018 | Prasad | H04W 4/50 |

FOREIGN PATENT DOCUMENTS

| | | |
|---|---|---|
| CN | 101459988 A | 6/2009 |
| CN | 101583169 A | 11/2009 |

(Continued)

OTHER PUBLICATIONS

International Search Report to PCT Application No. PCT/CN2017/111089 dated Aug. 1, 2018 with English translation, (6p).

(Continued)

*Primary Examiner* — Michael T Vu
(74) *Attorney, Agent, or Firm* — Arch & Lake LLP

(57) ABSTRACT

A user equipment access control method and device are provided, the method is applicable to a base station in a high-speed motion equipment special network. The method includes: determining a motion state of a user equipment which accesses a high-speed motion equipment special network; and determining whether to control the user equipment to access a public network according to the motion state. According to the embodiments of the present disclosure, on the basis of determining a motion state for accessing a high-speed motion equipment special network and then determining whether to control a user equipment to access a public network according to the motion state, a correspondence between motion states of the user equipment and whether to accesses a public network may be configured as needed.

16 Claims, 7 Drawing Sheets

(51) Int. Cl.
*H04W 36/00* (2009.01)
*H04W 84/04* (2009.01)

(56) References Cited

FOREIGN PATENT DOCUMENTS

| | | |
|---|---|---|
| CN | 101730081 A | 6/2010 |
| CN | 101964994 A | 2/2011 |
| CN | 102647766 A | 8/2012 |
| CN | 102938917 A | 2/2013 |
| CN | 104735640 A | 6/2015 |
| CN | 105491634 A | 4/2016 |
| CN | 105519153 A | 4/2016 |
| EP | 2900016 A1 | 7/2015 |
| EP | 3209058 A1 | 8/2017 |
| KR | 20090028613 A | 3/2009 |

OTHER PUBLICATIONS

First Office Action of the Chinese Application No. 201780001914.1, dated Apr. 28, 2020 with English translation, (15p).
English translation of the Written Opinion to International Application No. PCT/CN2017/111089, dated Aug. 1, 2018, (4p).

* cited by examiner

USER EQUIPMENT ACCESS CONTROL METHOD AND DEVICE

CROSS-REFERENCE TO RELATED APPLICATION

This application is a National Stage of International Application No. PCT/CN2017/111089, filed on Nov. 15, 2017, the contents of which are incorporated herein by reference in its entirety.

TECHNICAL FIELD

The disclosure relates to the technical field of communications, and in particular to a method and device for controlling access of a user equipment (UE), an electronic device and a computer-readable storage medium.

BACKGROUND

In order to guarantee the quality of communication for a user equipment (UE) in a high-speed motion state, operators have deployed high-speed moving device dedicated network for the high-speed motion UE to access.

In an area where a high-speed moving device dedicated network is overlapped with a public network (e.g., a normal 4G and 5G communication network), the high-speed moving device dedicated network usually has a higher signal intensity than the public network. As a UE generally selects to access a network with higher a signal intensity, the UE not in a high-speed motion state would also access the high-speed moving device dedicated network, when being in the overlapped area. This may cause congestion to the high-speed moving device dedicated network, and thereby affect the quality of communication of high-speed moving UEs.

SUMMARY

To this end, a method and device for controlling access of a user equipment (UE), an electronic device, and a computer-readable storage medium are provided in the disclosure to solve the technical problems in the related art.

According to a first aspect of the disclosure, proposed is a method for controlling access of a user equipment (UE), applicable for a base station in a high-speed moving device dedicated network, and the method including: determining a motion state of the UE that is coupled to the high-speed moving device dedicated network; and determining, according to the motion state, whether to control the UE to access a public network.

Optionally, the method further includes: acquiring information of cells in the public network, wherein determining the motion state of the UE that is coupled to the high-speed moving device dedicated network includes: acquiring history information of cells that had been accessed by the UE previously; determining, according to the information of the cells in the public network and the history information, cells in the public network that had been accessed by the UE previously and first data of the cells in the public network that had been accessed by the UE previously, and/or determining, according to the information of the cells in the public network and the history information, second data of cells in the high-speed moving device dedicated network that had been accessed by the UE previously; and determining the motion state of the UE according to at least one of the first data or the second data.

Optionally, determining the motion state of the UE according to at least one of the first data or the second data includes: determining whether the first data is smaller than the second data; and determining that the UE is in a high-speed motion state in response to the first data being smaller than the second data, or determining that the UE is in a low-speed motion state in response to the first data being greater than or equal to the second data.

Optionally, determining the motion state of the UE according to at least one of the first data or the second data includes: determining at least one of the following whether the first data is smaller than a first preset value, or whether the second data is greater than the second preset value, wherein the second preset value is greater than the first preset value; and determining that the UE is in a high-speed motion state in at least one of the following cases: the first data is smaller than the first preset value, or the second data is greater than the second preset value, or determining that the UE is in a low-speed motion state in at least one of the following cases: the first data is greater than or equal to the first preset value, or the second data is smaller than or equal to the second preset value.

Optionally, the first data includes at least one of: a first number of times, a first frequency, or a first duration; and/or the second data includes at least one of: a second number of times, a second frequency, or a second duration.

Optionally, determining the motion state of the UE that is coupled to the high-speed moving device dedicated network includes: receiving a number, recorded by the UE in a time unit, of pieces of information of neighbor cells of a serving cell of the UE; and determining the motion state of the UE according to a relation between the number and one or more preset numbers, and association information of the relation with the motion state.

Optionally, the one or more preset numbers includes a first preset number and a second preset number, and the second preset number is greater than or equal to the first preset number, wherein determining the motion state of the UE according to the relation between the number and the one or more preset numbers, and the association information of the relation with the motion state includes one of: determining that the UE is in a low-speed motion state in response to the number being smaller than or equal to the first preset number; or determining that the UE is in a high-speed motion state in response to the number being greater than or equal to the first preset number Optionally, the information of each of the neighbor cells includes at least one of: an identifier of the neighbor cell, a system message of the neighbor cell, or a paging message of the neighbor cell.

Optionally, determining, according to the motion state, whether to control the UE to access a public network includes: controlling the UE to access the public network, when the UE is in the low-speed motion state.

Optionally, the high-speed moving device dedicated network includes at least one of: a high-speed railway dedicated network, or a highway dedicated network.

According to a second aspect of the disclosure, proposed is a device for controlling access of a user equipment (UE), applicable for a base station in a high-speed moving device dedicated network, and the device including: a state determination module, configured to determine a motion state of the UE that is coupled to the high-speed moving device dedicated network; and an access determination module, configured to determine, according to the motion state, whether to control the UE to access a public network.

Optionally, the device further includes: an information acquisition module, configured to acquire information of cells in the public network. The state determination module includes: an information acquisition sub-module, configured to acquire history information of cells that had been accessed by the UE previously; a data determination sub-module, configured to determine, according to the information of the cells in the public network and the history information, cells in the public network that had been accessed by the UE previously and first data of the cells in the public network that had been accessed by the UE previously, and/or determine, according to the information of the cells in the public network and the history information, second data of cells in the high-speed moving device dedicated network that had been accessed by the UE previously; and a state determination sub-module, configured to determine the motion state of the UE according to at least one of the first data or the second data.

Optionally, the state determination sub-module is configured to determine whether the first data is smaller than the second data; and determine that the UE is in a high-speed motion state in response to the first data being smaller than the second data, or determine that the UE is in a low-speed motion state in response to the first data being greater than or equal to the second data.

Optionally, the state determination sub-module is configured to: determine at least one of the following: whether the first data is smaller than a first preset value, or whether the second data is greater than the second preset value, wherein the second preset value is greater than the first preset value; and determine that the UE is in a high-speed motion state in at least one of the following cases: the first data is smaller than the first preset value, or the second data is greater than the second preset value, or determine that the UE is in a low-speed motion state in at least one of the following cases: the first data is greater than or equal to the first preset value, or the second data is smaller than or equal to the second preset value.

Optionally, the first data includes at least one of: a first number of times, a first frequency, or a first duration; and/or the second data includes at least one of: a second number of times, a second frequency, or a second duration.

Optionally, the sending module includes: a number receiving sub-module, configured to receive a number, recorded by the UE in a time unit, of pieces of information of neighbor cells of a serving cell of the UE; and a state determination sub-module, configured to determine the motion state of the UE according to a relation between the number and one or more preset numbers, and association information of the relation with the motion state.

Optionally, the one or more preset numbers include a first preset number and a second preset number, and the second preset number is greater than or equal to the first preset number, wherein the state determination sub-module is configured to perform at least one of: determining that the UE is in a low-speed motion state in response to the number being smaller than or equal to the first preset number; or determining that the UE is in a high-speed motion state in response to the number being greater than or equal to the second preset number.

Optionally, the information of each of the neighbor cells includes: an identifier of the neighbor cell, a system message of the neighbor cell, or a paging message of the neighbor cell.

Optionally, the access determination module is configured to: control the UE to access the public network, when the UE is in the low-speed motion state.

Optionally, the high-speed moving device dedicated network includes at least one of: a high-speed railway dedicated network, or a highway dedicated network.

According to a third aspect of the disclosure, provided is an electronic device, including: a processor, and a memory stored with processor-executable instructions, wherein the processor is configured to: determine a motion state of a user equipment (UE) that is coupled to a high-speed moving device dedicated network; and determine, according to the motion state, whether to control the UE to access a public network.

According to a fourth aspect of the disclosure, provided is a computer-readable storage medium with a computer program stored thereon, applicable for a base station in a high-speed moving device dedicated network, wherein the program is configured to, when executed by a processor, implement the following steps: determining a motion state of the UE that is coupled to the high-speed moving device dedicated network; and determining, according to the motion state, whether to control the UE to access a public network.

According to the embodiments of the disclosure, a motion state of a user equipment (UE) that is coupled to a high-speed moving device dedicated network is determined, and whether to control the UE to access a public network is then determined according to the motion state. On this basis, correspondences between motion states of the UE and whether to access the public network can be configured as required, so as to control a UE, which is in a motion state different from the motion state of another UE needing to access the high-speed moving device dedicated network, to access the public network. In this way, congestion in the high-speed moving device dedicated network can be avoided, and the quality of communication of the UE that is coupled to the high-speed moving device dedicated network is guaranteed.

BRIEF DESCRIPTION OF THE DRAWINGS

In order to more clearly illustrate technical solutions in the embodiments of the disclosure, brief introduction to the drawings required for the description of the embodiments will be provided below. Obviously, the drawings in the following description are only some of the embodiments of the present invention, and those of ordinary skill in the art would be able to obtain other drawings as well from these drawings without paying any inventive effort.

DETAILED DESCRIPTION

The technical solutions of the embodiments of the disclosure will be described clearly and completely here below in conjunction with the accompanying drawings of the embodiments of the disclosure. Obviously, the described embodiments are merely some of the embodiments rather than all embodiments of the disclosure. Based on the embodiments of the disclosure, all other embodiments obtained by those of ordinary skill in the art without making any inventive effort shall fall within the protection scope of the disclosure.

Figure 1:
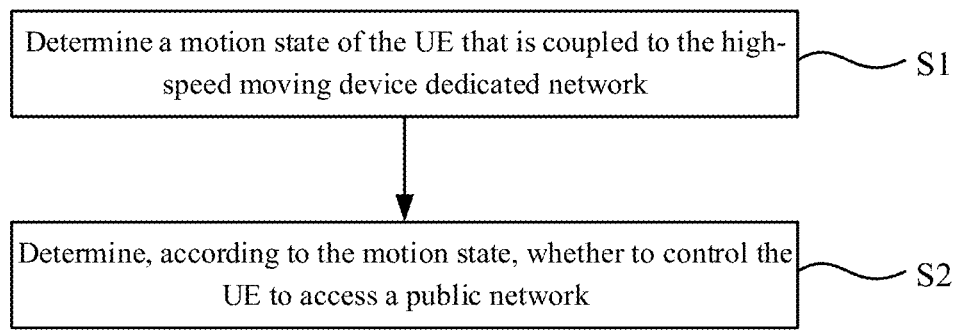
FIG. 1 illustrates a schematic flowchart of a method for controlling access of a user equipment according to an embodiment of the disclosure.

FIG. 1 illustrates a schematic flowchart of a method for controlling access of a user equipment (UE) according to an embodiment of the disclosure. The method in this embodiment may be applicable for a base station providing a high-speed moving device dedicated network. As illustrated in FIG. 1, the method may include steps S1 and S2.

In step S1, a motion state of the UE that is coupled to the high-speed moving device dedicated network is determined.

In step S2, whether to control the UE to access a public network is determined according to the motion state.

In an embodiment, the high-speed moving device dedicated network may be a high-speed railway dedicated network, or may be a highway dedicated network. A cell in the high-speed moving device dedicated network may contain multiple sub-cells with identical identifiers.

In an embodiment, a base station providing a high-speed moving device dedicated network may acquire a motion state of a UE that is coupled to the high-speed moving device dedicated network. For example, the UE determines the motion state of itself and transmits the motion state to the base station. Alternatively, the base station may acquire position information of the UE, determine a motion speed of the UE according to a change in the position information of the UE in a time unit, and then determine a motion state of the UE according to the motion speed of the UE. The way of determining the motion state of the UE is not limited to those described above, and may be designed as desired.

In an embodiment, after the motion speed of the UE is determined, the motion speed of the UE may be compared to a preset speed. If the motion speed of the UE is greater than the preset speed, it can be determined that the UE is in a high-speed motion state. If the motion speed of the UE is smaller than or equal to the preset speed, it can be determined that the UE is in a low-speed motion state. One or more preset speeds may be provided according to the number of motion states of the UE, and each of the one or more preset speeds may be configured as desired.

In an embodiment, there may be different cases for the motion states of the UE. For example, the motion states of the UE may include a low-speed motion state and a high-speed motion state, or may include a low-speed motion state, a medium-speed motion speed and a high-speed motion state.

In an embodiment, a motion state of a UE that is coupled to a high-speed moving device dedicated network is determined, and then whether to control the UE to access a public network is determined according to the motion state. On this basis, correspondences between motion states of a UE and whether to access the public network can be configured as desired, so as to control the UE, which is in a motion state different from that of another UE needing to access the high-speed moving device dedicated network, to access the public network. In this way, congestion in the high-speed moving device dedicated network can be avoided, and the quality of communication of the UE that is coupled to the high-speed moving device dedicated network is guaranteed.

For example, it may be determined to control a UE in a low-speed motion state to access a public network, so as to guarantee good quality of communication of UEs, in a high-speed motion state, that is coupled to the high-speed moving device dedicated network.

Figure 2:
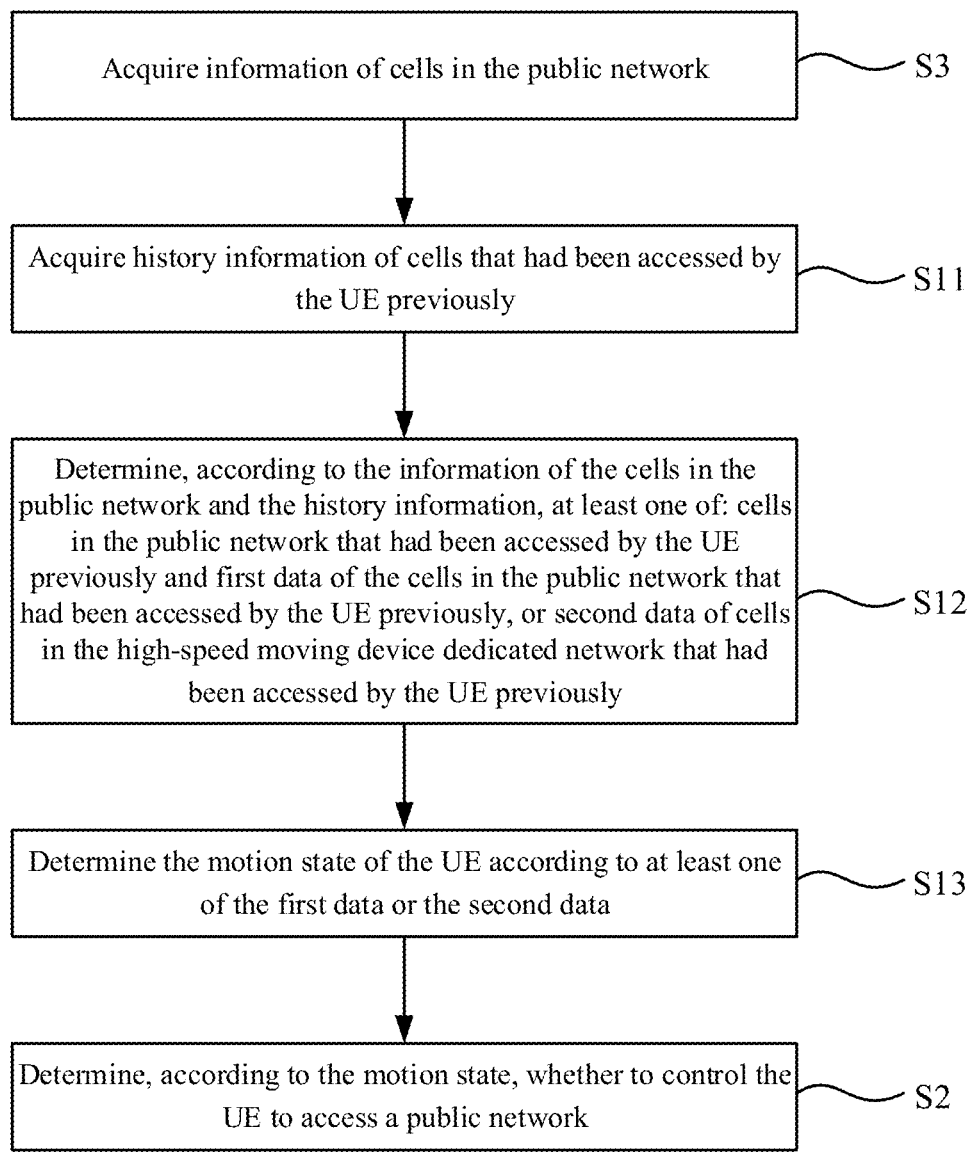
FIG. 2 illustrates a schematic flowchart of another method for controlling access of a user equipment according to an embodiment of the disclosure.

FIG. 2 illustrates a schematic flowchart of another method for controlling access of a user equipment according to an embodiment of the disclosure. As illustrated in FIG. 2, based on the embodiment according to FIG. 1, the method for controlling access of a user equipment further includes step S3.

In step S3, information of cells in the public network is acquired.

In an embodiment, the base station in the high-speed moving device dedicated network may acquire information of cells in a public network along the high-speed moving device dedicated network. The information of the cells in the public networks may be configured in an operation administration and maintenance (OAM) system by an operator, so as to be acquired by the base station in the high-speed moving device dedicated network.

The operation that the motion state of the UE that is coupled to the high-speed moving device dedicated network is determined includes steps S11, S12 and S13.

In step S11, history information of cells that had been accessed by the UE previously is acquired.

In step S12, cells in the public network that had been accessed by the UE previously, and first data of the cells in the public network that had been accessed by the UE previously are determined according to the information of the cells in the public network and the history information, and/or second data of cells in the high-speed moving device dedicated network that had been accessed by the UE previously is determined according to the information of the cells in the public network and the history information.

In step S13, the motion state of the UE is determined according to at least one of the first data or the second data.

In an embodiment, the information of the cells in the public network (for example, identifiers of the cells in the public network) may be compared with the history information of the cells that had been accessed by the UE previously (for example, including identifiers of cells in the public network and identifiers of cells in the high-speed moving device dedicated network), to determine which of the cells that had been accessed by the UE previously are cells in the public network, and determine the first data of the cells in the public network that had been accessed by the UE previously. Moreover, the second data of the cells in the high-speed moving device dedicated network that had been accessed by the UE previously can also be determined according to the history information of cells that had been accessed by the UE previously.

In an embodiment, the first data includes at least one of: a first number of times, a first frequency, or a first duration; and/or the second data includes at least one of: a second number of times, a second frequency, or a second duration. The case in which the first data includes a first number of times and the second data includes a second number of times is taken as an example.

The motion state of the UE may be determined according to the first number of times merely. For example, if the first number of times is greater than or equal to a first preset number of times, the motion state of the UE is determined to be a low-speed motion state, and if the first number of times is smaller than the first preset number of times, the motion state of the UE is determined to be a high-speed motion state.

The motion state of the UE may also be determined according to the second number of times merely. For example, if the second number of times is greater than or equal to a second preset number of times, the motion state of the UE is determined to be a high-speed motion state, and if the second number of times is smaller than the second preset number of times, the motion state of the UE is determined to be a low-speed motion state.

The motion state of the UE may also be determined according to both the first number of times and the second number of times. For example, if the second number of times is greater than the first number of times, the motion state of the UE is determined to be a high-speed motion state, and if the second number of times is smaller than the first number of times, the motion state of the UE is determined to be a low-speed motion state.

In an embodiment, a historical duration corresponding to the acquired history information may be set as desired. For example, the historical duration may be a preset duration dating back to the past from a current moment, or a period dating from a moment in the past to another moment in the past. The preset duration or the period may be set by the base station, or may be set by the operator through the OAM system.

Figure 3:
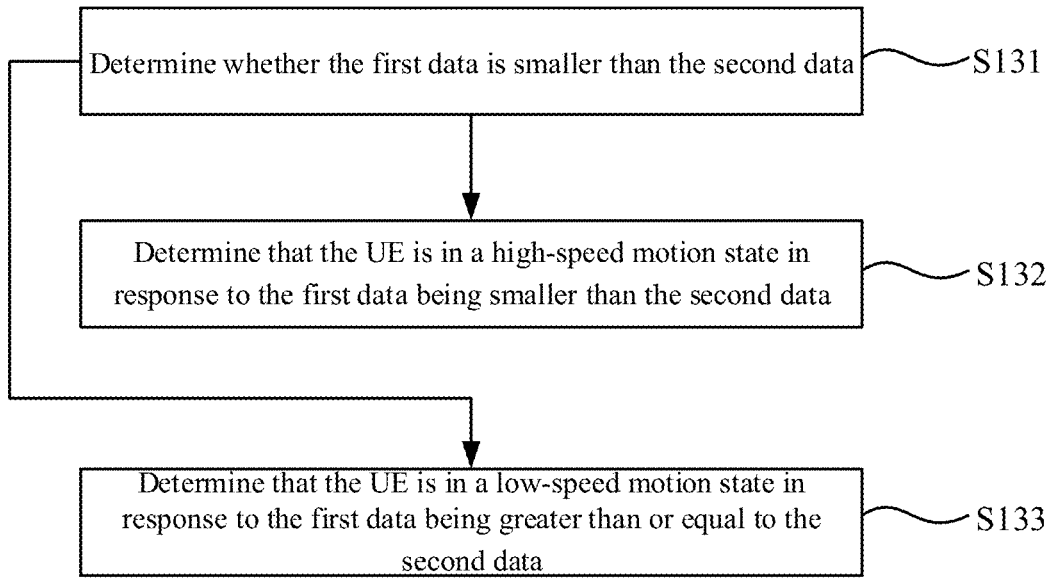
FIG. 3 illustrates a schematic flowchart of a method for determining a motion state of a user equipment according to an embodiment of the disclosure.

FIG. 3 illustrates a schematic flowchart of a method for determining a motion state of a user equipment according to an embodiment of the disclosure. As illustrated in FIG. 3, based on the embodiment according to FIG. 2, the operation that the motion state of the UE is determined according to at least one of the first data or the second data includes steps S131, S132 and S133.

In step S131, whether the first data is smaller than the second data is determined.

In step S132, it is determined that the UE is in a high-speed motion state in response to the first data being smaller than the second data.

In step S133, it is determined that the user equipment is in a low-speed motion state in response to the first data being greater than or equal to the second data.

In an embodiment, the first data includes at least one of: a first number of times, or a first frequency, and/or, the second data includes at least one of: a second number of times, or a second frequency. The case in which the first data includes a first number of times and the second data includes a second number of times is taken as an example.

Generally, a UE in a high-speed motion state would move along a high-speed moving device dedicated network, and a UE in a low-speed motion state would move in a public network. Therefore, compared with the UE in the low-speed motion state, the UE in the high-speed motion state would access the high-speed moving device dedicated network more frequently, that is to say, the second number of times is greater than the first number of times. Therefore, it may be determined that the UE is in a high-speed motion state when the first data is smaller than the second data, namely, the first number of times is smaller than the second number of times.

Correspondingly, it can be determined that the UE is in a low-speed motion state if the first data is greater than or equal to the second data.

It is to be noted that, besides the way of determining the motion state of the UE in the embodiment according to FIG. 3, the motion state of the UE may also be determined in another way. That is to say, it is determined that the UE is in a low-speed motion state if the first data is smaller than the second data, and it is determined that the UE is in a low-speed motion state if the first data is greater than or equal to the second data. The specific way can be selected as desired.

Figure 4:
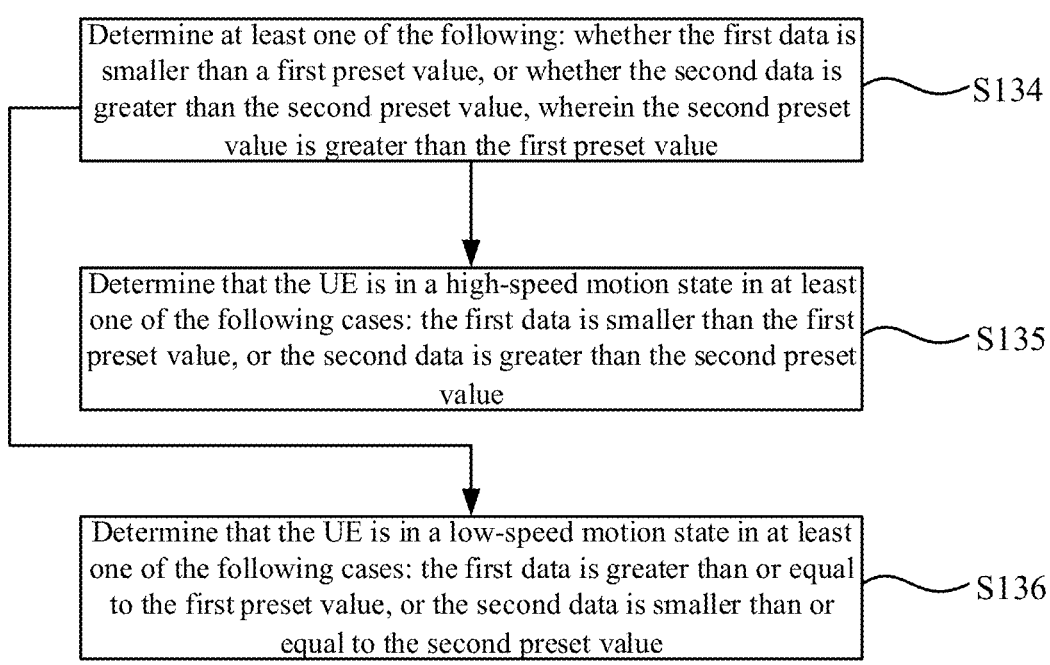
FIG. 4 illustrates a schematic flowchart of another method for determining a motion state of a user equipment according to an embodiment of the disclosure.

FIG. 4 illustrates a schematic flowchart of another method for determining a motion state of a user equipment according to an embodiment of the disclosure. As illustrated in FIG. 4, based on the embodiment according to FIG. 2, the operation that the motion state of the UE is determined according to at least one of the first data or the second data includes steps S134, S135 and S136.

In step S134, whether the first data is smaller than a first preset value, and/or whether the second data is greater than the second preset value is determined. The second preset value is greater than the first preset value.

In step S135, it is determined that the UE is in a high-speed motion state in at least one of the following cases: the first data is smaller than the first preset value, or the second data is greater than the second preset value.

In step S136, it is determined that the UE is in a low-speed motion state in at least one of the following cases: the first data is greater than or equal to the first preset value, or the second data is smaller than or equal to the second preset value.

In an embodiment, different from the embodiment according to FIG. 3, instead of determining the motion state of the UE by directly comparing the first data to the second data, the motion state of the UE is determined by comparing the first data to the first preset value and comparing the second data to the second preset value.

The case in which the first data includes a first number of times and the second data includes a second number of times is taken as an example.

A UE in a high-speed motion state would move along a high-speed moving device dedicated network, and a UE in a low-speed motion state would move in a public network. Therefore, the UE in the high-speed motion state would access the high-speed moving device dedicated network more frequently than the public network, that is to say, the second number of times is greater than the first number of times. Therefore, it can be determined that the UE is in a high-speed motion state, when the first number of times is smaller than the first preset value, that is, the number of times that the UE have accessed cells in the public network is smaller, and/or when the second number of times is greater than the second preset value, that is, the number of times that the UE have accessed cells in the high-speed moving device dedicated network is larger.

Correspondingly, it can be determined that the UE is in a low-speed motion state, when the first number of times is greater than or equal to the first preset value, that is, the number of times that the UE have accessed cells in the public network is larger, and/or when the second number of times is smaller than or equal to the second preset value, that is, the number of times that the UE have accessed cells in the high-speed moving device dedicated network is smaller.

Optionally, the first data includes at least one of: a first number of times, a first frequency, or a first duration; and/or the second data includes at least one of: a second number of times, a second frequency, or a second duration.

In an embodiment, any one of or a combination of two or even three of: the first number, the first frequency and the first duration may be taken as the first data. Any one of or a combination of two or even three of: the second number, the second frequency and the second duration may also be taken as the second data. This can be designed as needed.

Figure 5:
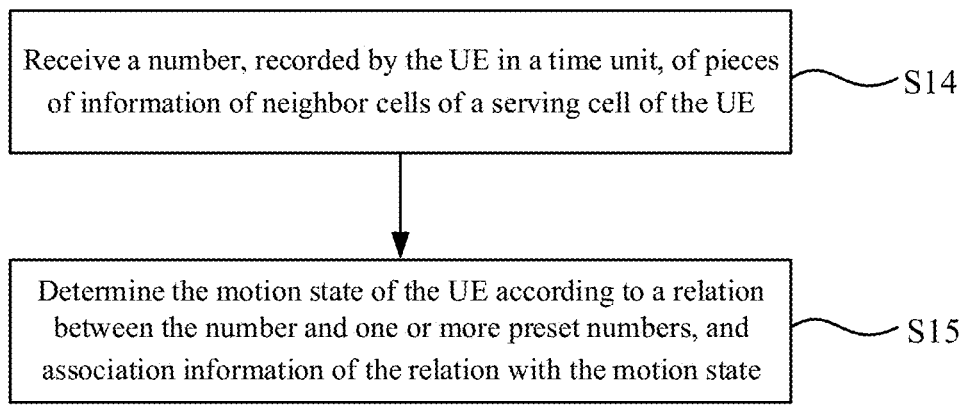
FIG. 5 illustrates a schematic flowchart of a further method for determining a motion state of a user equipment according to an embodiment of the disclosure.

FIG. 5 illustrates a schematic flowchart of a further method for determining a motion state of a user equipment according to an embodiment of the disclosure. As illustrated in FIG. 5, based on the embodiment according to FIG. 1, the operation that the motion state of the UE that is coupled to the high-speed moving device dedicated network is determined includes step S14.

In step S14, a number, recorded by the UE in a time unit, of pieces of information of neighbor cells of a serving cell of the UE is received.

In an embodiment, the information of each of the neighbor cells may include at least one of: an identifier of the neighbor cell, a system message of the neighbor cell, a paging message of the neighbor cell or the like.

With the information of the neighbor cell being the identifier of the neighbor cell as an example, the UE would detect an identifier of a neighbor cell of a serving cell periodically (for example, to determine a cell that can be accessed).

Figure 6:
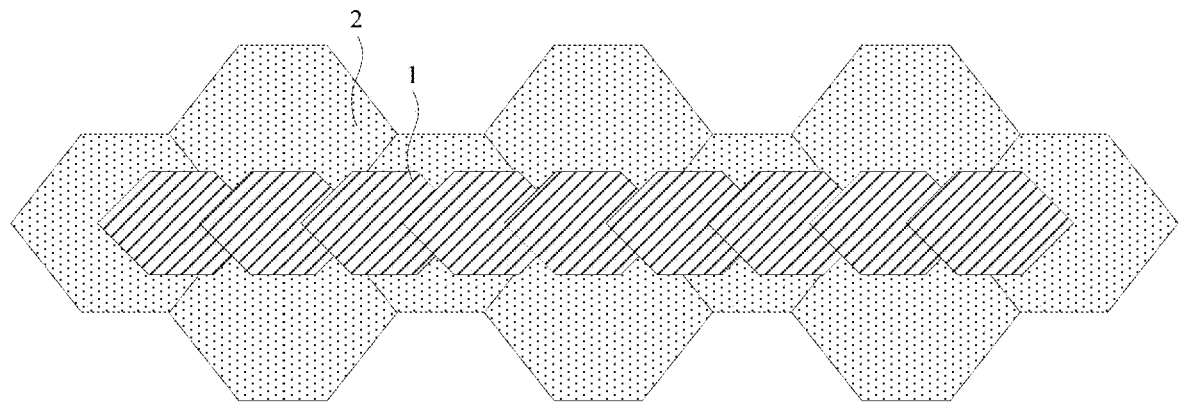
FIG. 6 illustrates a schematic diagram of a relation between cells in a high-speed moving device dedicated network and cells in a public network according to an embodiment of the disclosure.

FIG. 6 illustrates a schematic diagram of a relation between cells in a high-speed moving device dedicated network and cells in a public network according to an embodiment of the disclosure.

As illustrated in FIG. 6, a cell 1 in the high-speed moving device dedicated network contains multiple sub-cells with identical identifiers (system messages sent from the sub-cells may also be identical to each other, and paging messages sent from the sub-cells may also be identical to each other). For example, the serving cell of the UE is the cell 1 in the high-speed moving device dedicated network, the neighbor cell detected by the UE is a cell 2 in a public network adjacent to the cell 1 in the high-speed moving device dedicated network.

When the UE is in a still state, the neighbor cell of the serving cell of the UE does not change, and the number of pieces of information of neighbor cells recorded in a time unit only includes the number of pieces of information of current neighbor cells. When the UE is in a motion state, the neighbor cell of the serving cell of the UE will change, and the number of pieces of information of neighbor cells recorded in a time unit includes the number of pieces of information of all neighbor cells on a motion path in the time unit. As the motion speed of the UE is higher, the motion path in the time unit is longer, and the number of pieces of information of neighbor cells recorded is larger. For example, as illustrated in FIG. 6, the serving cells of the UE is the cell 1 in the high-speed moving device dedicated network. As the UE is moving faster, the number of identifiers of cells 2 in the public network recorded in a time unit is larger.

In step S15, the motion state of the UE is determined according to a relation between the number and one or more preset numbers, and association information of the relation with the motion state.

In an embodiment, the relation between the number and the one or more preset numbers would be different as the number of the preset numbers is different. The corresponding number of motion states of the UE may also be different.

For example, if one preset number is provided, a first relation between the number and the preset number may be the number being greater than or equal to the preset number, and a second relation between the number and the preset number may be the number being smaller than the preset number. The first relation may correspond to a low-speed motion speed, and the second relation may correspond to a high-speed motion speed.

For example, if two preset numbers are provided, i.e., a first preset number and a second preset number greater than the first preset number: a first relation between the number and one of the preset number may be the number being smaller than the first preset number, a second relation may be the number being greater than or equal to the first preset number and smaller than or equal to the second preset number, and a third relation may be the number being greater than the second preset number. The first relation may correspond to a low-speed motion state, the second relation may correspond to a medium-speed motion state, and the third relation may correspond to a high-speed motion state.

In an embodiment, as the motion speed of the UE is higher, the number of pieces of information of neighbor cells recorded in a time unit is larger. As the motion speed of the UE is lower, the number of pieces of information of neighbor cells recorded in a time unit is smaller. Therefore, the preset numbers, and association information of the relation, between the preset numbers and the number of pieces of information of neighbor cells recorded by the UE, with the motion state can be configured in advance. Thus, the relation between the preset numbers and the number of pieces of information of neighbor cells recorded by the UE, and the association information of the relation with the motion state may be determined, so as to determine the motion state of the UE.

For example, if the number of pieces of information of neighbor cells recorded by the UE is greater than the preset number, it can be determined, according to the relation, that the UE is in a high-speed motion state. If the number of pieces of information of neighbor cells recorded by the UE is smaller than or equal to the preset number, it can be determined, according to the relation, that the UE is in a low-speed motion state.

It is to be noted that the one or more preset numbers and/or the association information in the embodiment according to FIG. 5 may be configured at the UE side or the base station side.

Figure 7:
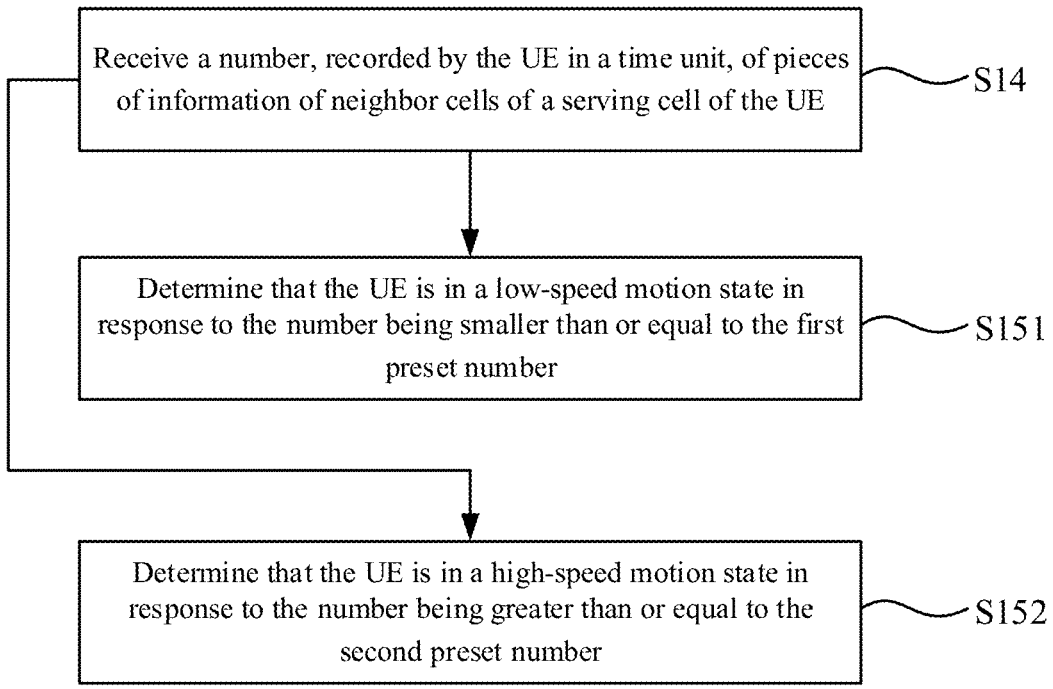
FIG. 7 illustrates a schematic flowchart of a further method for determining a motion state of a user equipment according to an embodiment of the disclosure.

FIG. 7 illustrates a schematic flowchart of a further method for determining a motion state of a user equipment according to an embodiment of the disclosure. As illustrated in FIG. 7, based on the embodiment according to FIG. 5, the one or more preset numbers includes a first preset number and a second preset number, and the second preset number is greater than or equal to the first preset number. The operation that the motion state of the UE is determined according to the relation between the number and the one or more preset numbers, and the association information of the relation with the motion state includes steps S151 and S152.

In step S151, it is determined that the UE is in a low-speed motion state in response to the number being smaller than or equal to the first preset number.

In step S152, it is determined that the UE is in a high-speed motion state in response to the number being greater than or equal to the second preset number.

In an embodiment, the higher the motion speed of the UE is, the larger the number of pieces of information of neighbor cells recorded in a time unit is. The lower the motion speed of the UE is, the smaller the number of pieces of information of neighbor cells recorded in a time unit is. The second preset number is greater than or equal to the first preset number. Therefore, if the number of pieces of information of neighbor cells recorded in a time unit is greater than or equal to the second preset number, it can be determined that the UE is moving in a high speed, that is, the UE is in a high-speed motion state. If the number of pieces of information of neighbor cells recorded in a time unit is smaller than or equal to the first preset number, it can be determined that the UE is moving in a low speed, that is, the UE is in a low-speed motion state.

Optionally, the information of each of the neighbor cells includes at least one of: an identifier of the neighbor cell, a system message of the neighbor cell, or a paging message of the neighbor cell.

In an embodiment, a cell in the high-speed moving device dedicated network contains multiple sub-cells. The sub-cells may have an identical identifier, and/or send an identical system message, and/or send an identical paging message.

Optionally, the operation that whether to control the UE to access a public network is determined according to the motion state includes the operation that the UE is controlled to access the public network, when the UE is in a low-speed motion state.

In an embodiment, when it is determined that the UE is in a low-speed motion state, the UE can be controlled to access the public network. Because the UE in a low-speed motion state may have good quality of communication if the UE is coupled to a cell in the public network, the UE, that is coupled to the high-speed moving device dedicated network, in a low-speed motion state may be controlled to turn to access the public network. In this way, congestion in the high-speed moving device dedicated network can be avoided, and the quality of communication of the UEs which are coupled to the high-speed moving device dedicated network is guaranteed.

Optionally, the high-speed moving device dedicated network includes at least one of: a high-speed railway dedicated network, or a highway dedicated network.

In an embodiment, a cell in the high-speed railway dedicated network may contain multiple sub-cells which may have an identical identifier. A cell in the highway dedicated network may contain multiple sub-cells which may have an identical identifier. Based on this, when the serving cell of the UE is the cell in the high-speed moving device dedicated network or the cell in the highway dedicated network, the UE will recognize the sub-cells as a same cell, thus avoiding frequent handover between cells during motion.

Corresponding to the embodiments of the method for determining a motion state of a UE, an embodiment of a device for determining a motion state of a UE is proposed in the disclosure.

Figure 8:
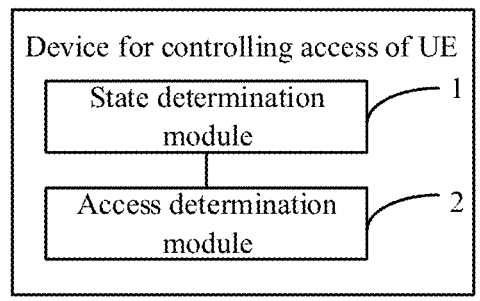
FIG. 8 illustrates a schematic block diagram of a device for controlling access of a user equipment according to an embodiment of the disclosure.

FIG. 8 illustrates a schematic block diagram of a device for controlling access of a user equipment according to an embodiment of the disclosure. As illustrated in FIG. 8, the device for controlling access of a user equipment (UE) is applicable for a base station in a high-speed moving device dedicated network and includes a state determination module 1 and an access determination module 2.

The state determination module 1 is configured to determine a motion state of the UE that is coupled to the high-speed moving device dedicated network.

The access determination module 2 is configured to determine, according to the motion state, whether to control the UE to access a public network.

Figure 9:
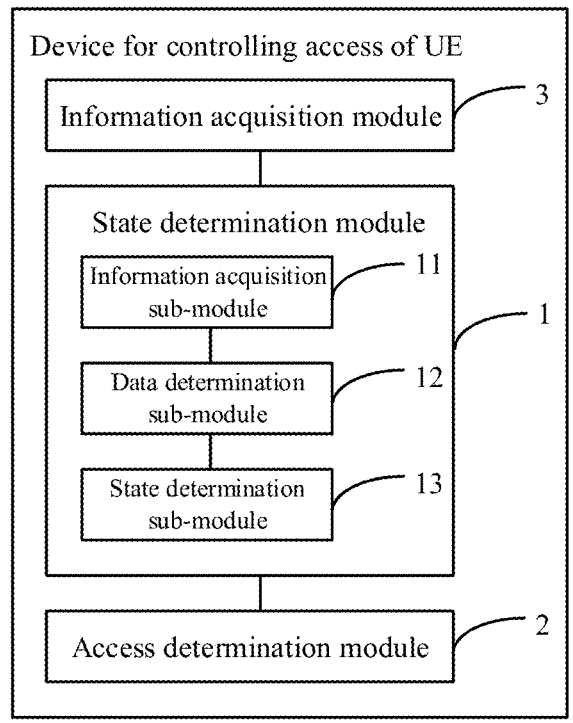
FIG. 9 illustrates a schematic block diagram of another device for controlling access of a user equipment according to an embodiment of the disclosure.

FIG. 9 illustrates a schematic block diagram of another device for controlling access of a user equipment according to an embodiment of the disclosure. As illustrated in FIG. 9, based on the embodiment according to FIG. 8, the device further includes an information acquisition module 3.

The information acquisition module 3 is configured to acquire information of cells in the public network.

The state determination module 1 includes: an information acquisition sub-module 11, a data determination sub-module 12 and a state determination sub-module 13.

The information acquisition sub-module 11 is configured to acquire history information of cells that had been accessed by the UE previously.

The data determination sub-module 12 is configured to determine, according to the information of the cells in the public network and the history information, cells in the public network that had been accessed by the UE previously and first data of the cells in the public network that had been accessed by the UE previously, and/or determine, according to the information of the cells in the public network and the history information, second data of cells in the high-speed moving device dedicated network that had been accessed by the UE previously.

The state determination sub-module 13 is configured to determine the motion state of the UE according to at least one of the first data or the second data.

Optionally, the state determination sub-module is configured to determine whether the first data is smaller than the second data; and determine that the UE is in a high-speed motion state in response to the first data being smaller than the second data, or determine that the UE is in a low-speed motion state in response to the first data being greater than or equal to the second data.

Optionally, the state determination sub-module is configured to: determine whether the first data is smaller than a first preset value, and/or whether the second data is greater than the second preset value. The second preset value is greater than the first preset value. The state determination sub-module is configured to determine that the UE is in a high-speed motion state in at least one of the following cases: the first data is smaller than the first preset value, or the second data is greater than the second preset value. The state determination sub-module is configured to determine that the UE is in a low-speed motion state in at least one of the following cases: the first data is greater than or equal to the first preset value, or the second data is smaller than or equal to the second preset value.

Optionally, the first data includes at least one of: a first number of times, a first frequency, or a first duration; and/or the second data includes at least one of: a second number of times, a second frequency, or a second duration.

Figure 10:
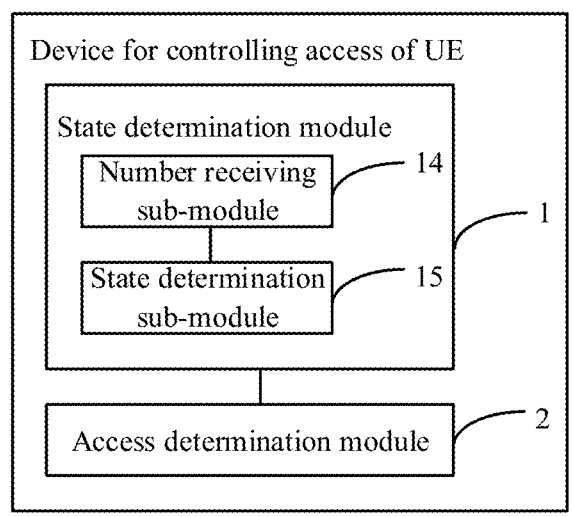
FIG. 10 illustrates a schematic block diagram of a further device for controlling access of a user equipment according to an embodiment of the disclosure.

FIG. 10 illustrates a schematic block diagram of a further device for controlling access of a user equipment according to an embodiment of the disclosure. As illustrated in FIG. 10, based on the embodiment according to FIG. 8, the state determination module includes: a number receiving sub-module 14 and a state determination sub-module 15.

The number receiving sub-module is configured to receive a number, recorded by the UE in a time unit, of pieces of information of neighbor cells of a serving cell of the UE.

The state determination sub-module is configured to determine the motion state of the UE according to a relation between the number and one or more preset numbers, and association information of the relation with the motion state.

Optionally, the one or more preset numbers includes a first preset number and a second preset number, and the second preset number is greater than or equal to the first preset number. The state determination sub-module is configured to perform at least one of: determining that the UE is in a low-speed motion state in response to the number being smaller than or equal to the first preset number; or determining that the UE is in a high-speed motion state in respone to the number being greater than or equal to the second preset number.

Optionally, the information of each of the neighbor cells includes at least one of: an identifier of the neighbor cell, a system message of the neighbor cell, or a paging message of the neighbor cell.

Optionally, the access determination module is configured to control the UE to access the public network, when the UE is in the low-speed motion state.

Optionally, the high-speed moving device dedicated network includes at least one of: a high-speed railway dedicated network, or a highway dedicated network.

With respect to the device in the embodiments above, details of operations executed by each module may refer to specific descriptions in the method embodiments and elaborations are omitted herein.

The device embodiments substantially correspond to the method embodiments, and thus for related parts, reference can be made to part of descriptions of the method embodiments. The device embodiment described above is only schematic, units described as separate parts therein may or may not be physically separated, and parts displayed as units may or may not be physical units, and namely may be located in the same place or may be distributed to multiple network units. Some or all of the modules may be selected according to a practical requirement to achieve the purpose of the solution of the present disclosure. Those of ordinary skill in the art may understand and implement without paying any creative effort.

An electronic device (which may be a base station providing a high-speed moving device dedicated network) is also proposed in embodiments of the disclosure. The electronic device includes: a processor, and a memory stored with processor-executable instructions. The processor is configured to: determine a motion state of a user equipment (UE) that is coupled to a high-speed moving device dedicated network; and determine, according to the motion state, whether to control the UE to access a public network.

Also proposed in embodiments of the disclosure is a computer-readable storage medium with a computer program stored thereon, applicable for a base station in a high-speed moving device dedicated network. The program is configured to, when executed by a processor, implement the operations of: determining a motion state of the UE that is coupled to the high-speed moving device dedicated network; and determining, according to the motion state, whether to control the UE to access a public network.

Figure 11:
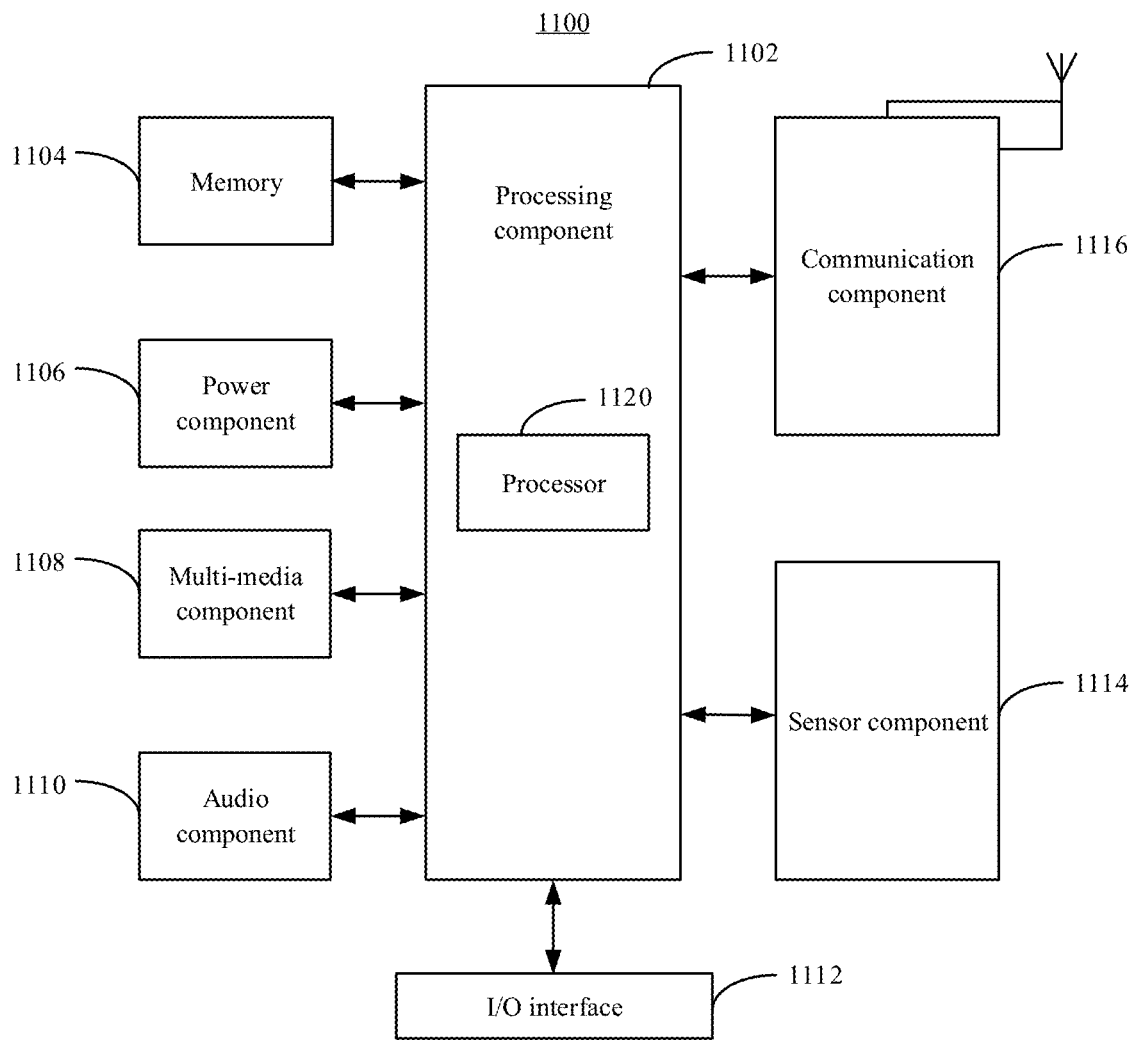
FIG. 11 illustrates a schematic block diagram of a device for controlling access of a user equipment according to an exemplary embodiment.

FIG. 11 illustrates a schematic block diagram of a device 1100 for controlling access of a user equipment according to an exemplary embodiment. For example, the device 1100 may be a mobile phone, a computer, a digital broadcast terminal, a message transceiving device, a game console, a tablet device, medical equipment, fitness equipment, a personal digital assistant, etc.

As illustrated in FIG. 11, the device 1100 may include one or more of the following: a processing component 1102, a memory 1104, a power component 1106, a multi-media component 1108, an audio component 1110, an input/output (I/O) interface 1112, a sensor component 1114, and a communication component 1116.

The processing component 1102 generally controls the overall operation of the device 1100, such as operations associated with display, a phone call, data communication, a camera operation and a recording operation. The processing component 1102 may include one or more processors 1120 to execute instructions, so as to complete all or some steps in the methods above. In addition, the processing component 1102 may include one or more modules for the interaction between the processing component 1102 and the other components. For example, the processing component 1102 may include a multi-media module for interaction between the multi-media component 1108 and the processing component 1102.

The memory 1104 is configured to store various types of data so as to support operations at the device 1100. The examples of these types of data include instructions of any application or method for operating on the device 1100, contact person data, phone book data, messages, pictures, video, etc. The memory 1104 may be implemented by any type of volatile or non-volatile storage device or a combination of both, for example, a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power component 1106 supplies power for the various components of the device 1100. The power component 1106 may include a power management system, one or more power sources, and other components associated with the generation, management and distribution of power for the device 1100.

The multi-media component 1108 includes a screen serving as an output interface between the device 1100 and a user. In some embodiments, the screen may include a liquid crystal display (LCD) and a touch pad (TP). If the screen includes a touch pad, then the screen may be implemented as a touch screen so as to receive an input signal from the user. The touch pad includes one or more touch sensors to sense touch, slide and gestures on the touch pad. The touch sensors may not only sense the boundary of a touch or slide action, but also can detect the duration and pressure related to the touch or slide operation. In some embodiments, the multi-media component 1108 includes a front camera and/or a rear camera. When the device 1100 is in an operating mode, such as a photography mode or a video mode, the front camera and/or the rear camera may receive external multi-media data. Each front camera and rear camera may be a fixed optical lens system or have a focal length or optical zoom capability.

The audio component 1110 is configured to output and/or input an audio signal. For example, the audio component 1110 includes a microphone (MIC), and when the device 1100 is in an operating mode, such as a calling mode, a recording mode and a voice recognition mode, the microphone is configured to receive an external audio signal. The received audio signal can be further stored in the memory 1104 or sent via the communication component 1116. In some embodiments, the audio component 1110 further includes a loudspeaker for outputting an audio signal.

The I/O interface 1112 provides an interface between the processing component 1102 and a peripheral interface module, and the above peripheral interface module may be a keyboard, a click wheel, a button, etc. The button may include but is not limited to a home page button, a volume button, a start button and a locking button.

The sensor component 1114 includes one or more sensors for providing state evaluation for the device 1100 from various aspects. For example, the sensor component 1114 may detect an on/off state of the device 1100, and the relative positioning between components; for example the components are a display and keyboard of the device 1100. The sensor component 1114 may also detect a positional change of the device 1100 or a component of the device 1100, whether there is contact between a user and the device 1100, the orientation or acceleration/deceleration of the device 1100, and a temperature change of the device 1100. The sensor component 1114 may include a proximity sensor configured to detect the existence of an object nearby without any physical contact. The sensor component 1114 may also include an optical sensor, such as a CMOS or CCD image sensor, for use in an imaging application. In some embodiments, the sensor component 1114 may also include an acceleration sensor, a gyroscope sensor, a magnetic sensor, a pressure sensor or a temperature sensor.

The communication component 1116 is configured for wired or wireless communication between the device 1100 and another device. The device 1100 may access a communication standard based wireless network, such as WiFi, 2G, 5G or a combination thereof. In an exemplary embodiment, the communication component 1116 receives a broadcast signal from an external broadcast management system or broadcasts relevant information through a broadcast channel. In an exemplary embodiment, the communication component 1116 further includes a near-field communication (NFC) module for short-range communication. For example, the NFC module may be implemented based on the radio-frequency identification (RFID) technique, the infrared data association (IrDA) technique, the ultra-wide band (UWB) technique, the bluetooth (BT) technique or others.

In an exemplary embodiment, the device 1100 may be implemented by one or more application-specific integrated circuit (ASIC), a digital signal processor (DSP), a digital signal processing device (DSPD), a programmable logic device (PLD), a field programmable gate array (FPGA), a controller, a micro-controller, a micro-processor or other electronic elements, for executing the method according to any of the embodiments above.

In an exemplary embodiment, a non-transitory computer-readable storage medium including instructions is also provided, for example a memory 1104 including instructions. The above instructions may be executed by the processor 1120 of the device 1100 to complete the above methods. For example, the non-transitory computer-readable storage medium may be a ROM, a random access memory (RAM), a CD-ROM, a magnetic tape, a floppy disk, an optical data storage device and so on.

It is to be noted that, the relational terms such as "first" and "second" herein are used for distinguishing an entity or operation from another, and are not to be construed as implying any actual relation or sequence between these entities or operations. The terms "comprise", "contain" or any other variants thereof are intended to be non-exclusive, so that a process, method, article or device comprising a series of elements can also comprise other elements not clearly listed or elements inherent to the process, method, article or device. Without more limitations, an element defined by the phrase "comprising a . . . " does not include the process, method, article or device comprising the element from further comprising other same elements.

The method and device provided in the embodiments of the disclosure are introduced in detail above. Particular examples are used herein to explain the principle and implementations of the disclosure, and the description of the embodiments above are only used for helping understanding the method of the invention and the core concept thereof. For those of ordinary skill in the art, changes may be made to both the implementations and the applied range according to the concept of the disclosure. In summary, the content in the specification should not be construed as limitations of the invention.

What is claimed is:

1. A method for controlling access of a user equipment (UE), executed by a base station in a high-speed moving device dedicated network, and the method comprising:
    determining a motion state of the UE that is coupled to the high-speed moving device dedicated network by performing acts comprising:
    in response to acquiring information of cells in a public network; acquiring history information, wherein the history information comprises cells that had been accessed by the UE previously; determining, according to the information of the cells in the public network and the history information, cells in the public network that had been accessed by the UE previously and first data of the cells in the public network that had been accessed by the UE previously, second data of cells in the high-speed moving device dedicated network that had been accessed by the UE previously; and determining the motion state of the UE according to at least one of the first data or the second data; and
    in response to receiving a number, recorded by the UE in a time unit, of pieces of information of neighbor cells of a serving cell of the UE; and determining the motion state of the UE according to a relation between the number and one or more preset numbers, and association information of the relation with the motion state; and
    determining, according to the motion state, whether to control the UE to access a public network.

2. The method according to claim 1, wherein determining the motion state of the UE according to at least one of the first data or the second data comprises:
    determining whether the first data is smaller than the second data; and
    determining that the UE is in a high-speed motion state in response to the first data being smaller than the second data; or
    determining that the UE is in a low-speed motion state in response to the first data being greater than or equal to the second data.

3. The method according to claim 2, wherein determining, according to the motion state, whether to control the UE to access the public network comprises:
    controlling the UE to access the public network, when the UE is in the low-speed motion state.

4. The method according to claim 1, wherein determining the motion state of the UE according to at least one of the first data or the second data comprises:
    determining at least one of the following: whether the first data is smaller than a first preset value, or whether the second data is greater than the second preset value, wherein the second preset value is greater than the first preset value; and determining that the UE is in a high-speed motion state in at least one of the following cases: the first data is smaller than the first preset value, or the second data is greater than the second preset value; or determining that the UE is in a low-speed motion state in at least one of the following cases: the first data is greater than or equal to the first preset value, or the second data is smaller than or equal to the second preset value.

5. The method according to claim 1, wherein:
the first data comprises at least one of: a first number of times, a first frequency, or a first duration; or
the second data comprises at least one of: a second number of times, a second frequency, or a second duration.

6. The method according to claim 1, wherein the one or more preset numbers comprise a first preset number and a second preset number, and the second preset number is greater than or equal to the first preset number,
wherein determining the motion state of the UE according to the relation between the number and the one or more preset numbers, and the association information of the relation with the motion state comprises one of:
determining that the UE is in a low-speed motion state in response to the number being smaller than or equal to the first preset number; or
determining that the UE is in a high-speed motion state in response to the number being greater than or equal to the second preset number.

7. The method according to claim 1, wherein the information of each of the neighbor cells comprises at least one of:
an identifier of the neighbor cell,
a system message of the neighbor cell, or
a paging message of the neighbor cell.

8. The method according to claim 1, wherein the high-speed moving device dedicated network comprises at least one of:
a high-speed railway dedicated network, or
a highway dedicated network.

9. A base station in a high-speed moving device dedicated network, comprising a memory stored with processor-executable instructions, and a processor, wherein the processor is configured to:
determine a motion state of a UE that is coupled to the high-speed moving device dedicated network by performing acts comprising:
in response to acquiring information of cells in a public network; acquiring history information, wherein the history information comprises cells that had been accessed by the UE previously; determining, according to the information of the cells in the public network and the history information, cells in the public network that had been accessed by the UE previously and first data of the cells in the public network that had been accessed by the UE previously, second data of cells in the high-speed moving device dedicated network that had been accessed by the UE previously; and determining the motion state of the UE according to at least one of the first data or the second data; and
in response to receiving a number, recorded by the UE in a time unit, of pieces of information of neighbor cells of a serving cell of the UE; and determining the motion state of the UE according to a relation between the number and one or more preset numbers, and association information of the relation with the motion state; and determine, according to the motion state, whether to control the UE to access a public network.

10. The device according to claim 9, wherein in determining the motion state of the UE according to at least one of the first data or the second data, the processor is configured to:
determine whether the first data is smaller than the second data, and
determine that the UE is in a high-speed motion state in response to the first data being smaller than the second data; or
determine that the UE is in a low-speed motion state in response to the first data being greater than or equal to the second data.

11. The device according to claim 10, wherein in determining, according to the motion state, whether to control the UE to access the public network, the processor is configured to: control the UE to access the public network, when the UE is in the low-speed motion state.

12. The device according to claim 9, wherein in determining the motion state of the UE according to at least one of the first data or the second data, the processor is configured to:
determine at least one of the following: whether the first data is smaller than a first preset value, or whether the second data is greater than the second preset value, wherein the second preset value is greater than the first preset value; and
determine that the UE is in a high-speed motion state in at least one of the following cases: the first data is smaller than the first preset value, or the second data is greater than the second preset value; or
determine that the UE is in a low-speed motion state in at least one of the following cases: the first data is greater than or equal to the first preset value, or the second data is smaller than or equal to the second preset value.

13. The device according to claim 9, wherein:
the first data comprises at least one of: a first number of times, a first frequency, or a first duration; or
the second data comprises at least one of: a second number of times, a second frequency, or a second duration.

14. The device according to claim 9, wherein the one or more preset numbers comprises a first preset number and a second preset number, and the second preset number is greater than or equal to the first preset number, and wherein in determining the motion state of the UE according to the relation between the number and the one or more preset numbers, and the association information of the relation with the motion state, the processor is configured to:
determine that the UE is in a low-speed motion state in response to the number being smaller than or equal to the first preset number; or
determine that the UE is in a high-speed motion state in response to the number being greater than or equal to the second preset number.

15. The device according to claim 9, wherein the information of each of the neighbor cells comprises at least one of:
an identifier of the neighbor cell,
a system message of the neighbor cell, or
a paging message of the neighbor cell.

16. The device according to claim 9, wherein the high-speed moving device dedicated network comprises at least one of:
a high-speed railway dedicated network, or
a high way dedicated network.

* * * * *